H. S. Cole,
Steam-Boiler Cleaner.
N° 80,144. Patented July 21, 1868.

United States Patent Office.

HENRY S. COLE, OF PAWTUCKET, RHODE ISLAND.

Letters Patent No. 80,144, dated July 21, 1868.

IMPROVEMENT IN STEAM-GENERATORS.

The Schedule referred to in these Letters Patent and making part of the same.

TO WHOM IT MAY CONCERN:

Be it known that I, HENRY S. COLE, of Pawtucket, in the county of Providence, State of Rhode Island, have invented a new and improved Method, Device, and Arrangement for the Prevention of "Foam" in Steam-Boilers.

Said improvement is specially adapted to the boilers of steam fire-engines operating in seaboard towns and cities, inasmuch as frequent necessity exists that salt water be used for steam purposes. It is a well-known fact that saline or other similarly-impregnated waters are, while being used in generating steam, liable to foam to such an extent as to greatly lessen the efficiency of the apparatus. It is to overcome this foaming that my improvement or invention is intended, and which in practice it fully accomplishes.

My invention consists in forcing water upon the water-surface within the boiler at proper intervals, in quantities sufficient to at once check the foam, at the same time insufficient to materially retard the generation of steam.

To enable others skilled in the art to construct, use, and operate my invention, I present the following full, clear, and exact description thereof, with the assistance of the accompanying drawings and figures, with letters of reference thereon.

Figure 1:
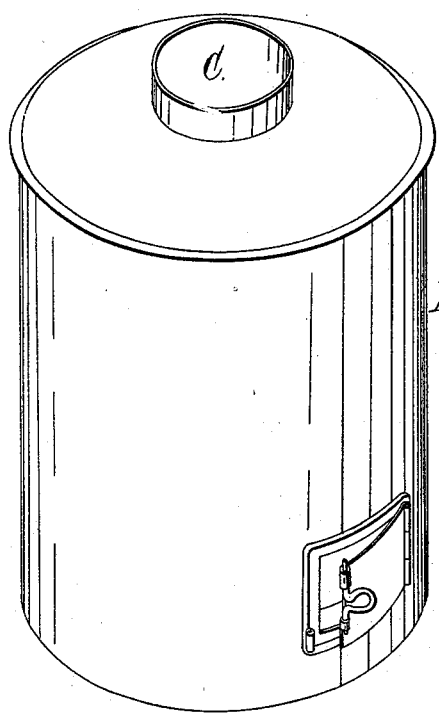
Figure 1 represents an elevation view of a common upright steam-boiler.
Figure 2:
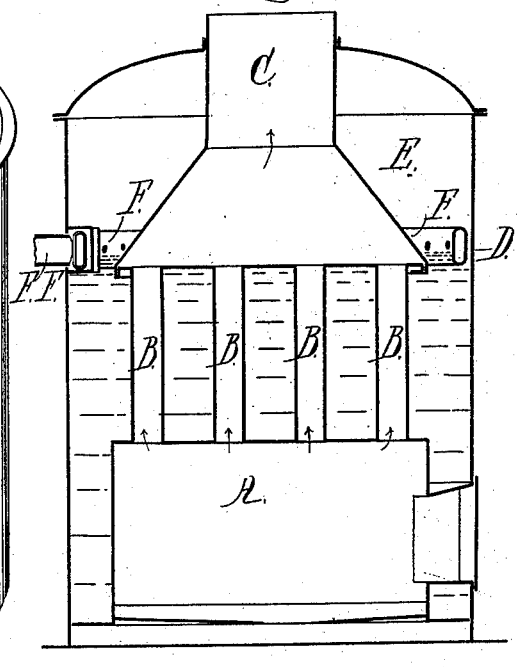
Figure 2 represents a sectional view of a steam-boiler containing my improvement.

A represents the fire-box.

B B B B, flue-tubes.

C represents the smoke-stack.

D represents the water-line.

E represents the steam-space.

F represents a round or flattened pipe, forming a circle within the boiler at or just above the water-line D. As will be seen in the drawing, this pipe is freely perforated with small holes.

F F represent a pipe leading from an injection-pump, (not shown.)

Figure 3:
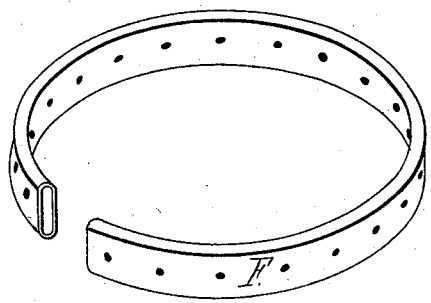

Figure 3 represents the round or flattened pipe F, before shown in section.

I do not claim the arrangement of fire-box flues, conical chamber, &c., as shown in my drawings, the same having been in public use for several years.

The operation is as follows: While using within the boiler saline or other similar waters liable to foam or rise while generating steam, small jets of water are thrown from the injection-pump through pipe F F, and the apertures in F upon the surface of the water at proper intervals, thus keeping down the foam.

The apertures in the pipe F may be round, oblong, continuous, or of any desired form.

I claim as my invention, and desire to secure by Letters Patent—

The perforated pipe F, at or near the water-line, substantially as described, for the purposes specified.

HENRY S. COLE.

Witnesses:
ROYAL LEE,
GEO. A. CARPENTER.